(12) United States Patent
Perl et al.

(10) Patent No.: US 8,091,421 B2
(45) Date of Patent: Jan. 10, 2012

(54) SYSTEM AND METHOD FOR MEASURING CONTENT OF A BIN

(75) Inventors: Ofir Perl, Ramat Hasharon (IL); Yossi Zlotnick, Haifa (IL)

(73) Assignee: A.P.M. Automation Solutions Ltd., Tel Aviv (IL)

( * ) Notice: Subject to any disclaimer, the term of this patent is extended or adjusted under 35 U.S.C. 154(b) by 547 days.

(21) Appl. No.: 10/571,693

(22) PCT Filed: Feb. 27, 2006

(86) PCT No.: PCT/IL2006/000260
§ 371 (c)(1),
(2), (4) Date: Sep. 21, 2008

(87) PCT Pub. No.: WO2006/090394
PCT Pub. Date: Aug. 31, 2006

(65) Prior Publication Data
US 2009/0007627 A1    Jan. 8, 2009

(51) Int. Cl.
*G01N 23/00* (2006.01)
(52) U.S. Cl. .................. 73/290 V; 73/602
(58) Field of Classification Search .......... 73/290 V, 73/602; 367/908
See application file for complete search history.

(56) References Cited

U.S. PATENT DOCUMENTS

| | | | | |
|---|---|---|---|---|
| 3,985,030 A | * | 10/1976 | Charlton | 73/290 V |
| 4,437,497 A | * | 3/1984 | Enander | 141/1 |
| 4,780,861 A | * | 10/1988 | Stembridge et al. | 367/150 |
| 4,798,232 A | * | 1/1989 | Stembridge et al. | 141/1 |
| 4,917,155 A | * | 4/1990 | Koblasz et al. | 141/1 |
| 4,944,335 A | * | 7/1990 | Stembridge et al. | 141/95 |
| 5,531,117 A | * | 7/1996 | Fortes | 73/602 |
| 6,581,459 B1 | * | 6/2003 | Lichtenfels, II | 73/290 V |
| 6,786,097 B2 | * | 9/2004 | Song et al. | 73/602 |

FOREIGN PATENT DOCUMENTS

CN    87101629    10/1987

OTHER PUBLICATIONS

M. Brandstein & D. Woods (eds.) "Microphone Arrays Signal Processing Techniques & Applications" (Springer 2005).

* cited by examiner

*Primary Examiner* — Hezron E Williams
*Assistant Examiner* — Rodney T. Frank
(74) *Attorney, Agent, or Firm* — Mark M. Friedman

(57) ABSTRACT

A system for measuring the height of bin content includes a transmitter for transmitting an acoustic pulse towards the upper surface of the content, a non-collinear receiver array for receiving an echo of the pulse and producing signals in response to the echo, and a processing apparatus for computing one or more directions of arrival of the signals from the upper surface to the array along with corresponding measured distances. Preferably, the receivers are transducers that also serve as transmitters. Two or more such measured distances constitute a map of the upper surface for estimating the quantity of the bin content. Preferably, the system includes a pulse shaper and repeater for optimizing the pulse shape relative to the signals.

18 Claims, 5 Drawing Sheets

SYSTEM AND METHOD FOR MEASURING CONTENT OF A BIN

FIELD AND BACKGROUND OF THE INVENTION

The present invention relates to monitoring of inventory and to process measurement, and, more particularly, to a system and method for measuring the content of a bin.

The monitoring of liquid inventory generally is straightforward. By contrast, the monitoring of bulk solid inventory that consists of particulates piled up inside a bin such as a silo often is very difficult. Examples of such bulk solid inventory include cement and sand for construction, grain, fertilizer, etc. The measurement of the level of bulk materials inside a bin is a problem that has not yet been solved adequately. The conditions inside bins typically are unfavorable (dust, extreme temperatures, etc.) and the contents of the bulk material stored in the bins often do not have a flat surface and are not always isotropic. Other difficulties arise from the wide variety of bin shapes in use and from the explosive atmospheres inside some bins.

The scope of the term "bin" as used herein includes any storage container, for bulk particulate solids, whose structure defines an interior volume for receiving and storing the solids. Such a bin may be closed above, below and on all sides, as is the case when the bin is a silo, vessel or tank, or may be open above or on one or more sides. The example of a "bin" that is used in the detailed description of the present invention below is a silo; but it will be obvious to those skilled in the art how to apply the principles of the present invention to any type of bin.

Five principal methods are known for continuous measurement of the content of a bin such as a silo.

An electromechanical (yo-yo) level sensor consists essentially of a weight at one end of a reel of tape. The weight is allowed to descend in the silo to the depth at which the top surface of the content is situated. When the weight settles on top of the content, the tension in the tape slackens. The weight then is retracted to the top set point. The height of the content is inferred from the time required to retract the weight or from the measured tape length.

Mechanical devices such as yo-yo sensors are unreliable. They tend to get clogged by dust and to get stuck on obstacles such as pumps and rods inside the silos.

Ultrasonic level sensors work on the principle of sound wave transmission and reception. High frequency sound waves from a transmitter are reflected by the top surface of the content to a receiver. The height of the content is inferred from the round-trip travel time. Such sensors have limited range and work poorly in the presence of dust. In addition, such devices need to be custom-designed for different types of silo.

Radar level sensors work on the principle of electromagnetic wave transmission and reception. Electromagnetic waves from a transmitter are reflected by the top surface of the content to a receiver. The height of the content is inferred from the round-trip travel time. Such sensors are complex and expensive.

Capacitance sensors measure the capacitance between two metallic rods or between a metallic rod and the ground. Because the silo content has a different dielectric constant than air, the capacitance changes according to the level of the top surface of the content between the two rods or between a rod and the ground. Such sensors tend to be inaccurate and are sensitive to humidity and to type of material stored in the silo.

All the prior art sensors discussed above are insensitive to the shape of the contents, and so are inaccurate in the presence of a common phenomenon called "coning" that occurs as bulk particulate solids are withdrawn via the base of a bin: an inverted conical hole, whose apex is directly above the point of withdrawal, tends to form in the bulk particulate solids. A similar phenomenon occurs as bulk particulate solids are added to a bin from the top: the solids tend to pile up in a cone whose apex is directly below the point of insertion of the solids. These sensors also work poorly in bins with complicated geometries and in the presence of obstacles.

A weight gauge measures the weight of a mobile silo and its content by measuring the tension in the rods that hold the silo. Installation of such gauges is complex, and they are suitable only for mobile silos with metallic legs.

There is thus a widely recognized need for, and it would be highly advantageous to have, a method of measuring the content of a bin such as a silo that would overcome the disadvantages of presently known methods as described above. In particular, it is not known in the prior art to map the upper surface of the bin contents in three dimensions.

SUMMARY OF THE INVENTION

According to the present invention there is provided a system for measuring a height of a content of a bin, including: (a) at least one transmitter for transmitting a pulse of acoustic energy towards an upper surface of the content; (b) an array of at least three non-collinear receivers for receiving an echo of the pulse, each receiver producing a respective signal in response to the echo; and (c) a processing apparatus for jointly transforming the signals into at least one measured distance from the array to the upper surface that includes: (i) for each receiver, a correlator for correlating a waveform of the pulse with the respective signal, thereby producing a correlated signal, and (ii) a beamformer for computing at least one direction of arrival of the correlated signals from the upper surface to the array.

According to the present invention there is provided a system for measuring a height of a content of a bin, including: (a) a transmitter for transmitting a pulse of acoustic energy towards an upper surface of the content; (b) at least one receiver for receiving an echo of the pulses, each at least one receiver producing a respective signal in response to each echo; and (c) a processing apparatus for transforming the at least one signal into estimated coordinates of a plurality of points of the upper surface.

According to the present invention there is provided a system for measuring a height of a content of a bin, including: (a) a transmitter for transmitting a pulse of acoustic energy towards an upper surface of the content; (b) at least one receiver for receiving an echo of the pulse, each at least one receiver producing a respective signal in response to the echo; (c) a pulse shaper and repeater operative to repeatedly transmit the pulse, using the transmitter, while adjusting at least one parameter, of a shape of the pulse, selected from the group consisting of a length of the pulse and a frequency of the pulse, responsive to the at least one signal, until the at least one signal is suitable for computing therefrom estimated coordinates of at least one point of the upper surface.

According to the present invention there is provided a method of measuring a height of content in a bin, including the steps of: (a) transmitting a pulse of acoustic energy towards an upper surface of the content; (b) receiving an echo of the pulse, using an array of at least three non-collinear receivers, each receiver producing a respective signal in response to the echo; and (c) transforming the signals into at least one measured distance from the array to the upper surface by steps including (i) for each receiver, correlating a waveform of the pulse with the respective signal to produce a correlated signal, (ii) computing at least one direction of arrival of the correlated signals from the upper surface to the array, and (iii) for each direction of arrival, computing a corresponding measured distance.

According to the present invention there is provided a method of measuring a height of a content of a bin, including the steps of: (a) transmitting a pulse of acoustic energy towards an upper surface of the content; (b) receiving an echo of the pulse, using at least one receiver, each at least one receiver producing a respective signal in response to the echo; and (c) transforming the signals into estimated coordinates of a plurality of points of the upper surface.

According to the present invention there is provided a method of measuring a height of a content of a bin, including the steps of: (a) transmitting a pulse of acoustic energy towards an upper surface of the content; (b) receiving an echo of the pulse, using at least one receiver, each at least one receiver producing a respective signal in response to the echo; and (c) repeating the transmitting and the receiving, while adjusting at least one parameter, of a shape of the pulse, selected from the group consisting of a length of the pulse and a frequency of the pulse, until the at least one signal is suitable for computing therefrom estimated coordinates of at least one point of the upper surface.

The system of the present invention is a system and method for measuring the height of the content of a bin and for estimating the volume and mass of the content from the measured height. Although the present invention is described below in terms of measuring the content of a silo, i.e., a bin enclosed by walls and a roof, the present invention also is applicable to measuring the content of an open bin. A basic system of the present invention includes a transmitter for transmitting a pulse of acoustic energy towards the upper surface of the content, an array of at least three non-collinear receivers that receive an echo of the pulse and produce respective signals in response to the echo, and a processing apparatus for jointly transforming the signals into one or more measured distances from the array to the upper surface. The processing apparatus includes, for each receiver, a correlator for correlating a waveform of the pulse with the receiver's respective signal, thereby producing a correlated signal, and also a beamformer for computing one or more directions of arrival of the correlated signals from the upper surface to the array. The processing apparatus then computes a/the measured distance(s) that correspond(s) to (each of) the direction(s) of arrival.

Preferably, the system also includes a thermometer for measuring the interior temperature of the bin. The transformation of the signals into the measured distance(s) is based on the measured interior temperature.

Preferably, the receivers are acoustic transceivers that also function as transmitters. Most preferably, the processing apparatus calibrates the transceivers by transmitting calibration pulses among the transceivers. In different most preferable embodiments of the system, the acoustic transceivers transmit the pulse either simultaneously or sequentially. Sequential transmission by transceivers expands the effective receiver array size and the virtual number of receivers.

Preferably, the processing apparatus transforms the signals into a plurality of measured distances from the receiver array to the upper surface of the bin content. The plurality of measured distances constitutes a map of the upper surface of the bin content. Most preferably, the processing apparatus is operative to transform the map into an estimate of the quantity (e.g., the volume or the mass) of the bin content.

Preferably, the system includes a pulse shaper and repeater that is operative to repeatedly transmit the pulse, using the at least one transmitter, while adjusting the shape of the pulse, responsive to the signals, until the signals are suitable for being transformed by the processing apparatus into the one or more measured distances. Most preferably, the pulse shaper and repeater adjusts the pulse shape by adjusting a parameter of the pulse shape that is selected from the group consisting of a length of the pulse and a frequency of the pulse. The frequency that is adjusted may be any frequency that defines the pulse, such as the low pass frequency of the pulse, the high pass frequency of the pulse or the modulation frequency of the pulse.

Preferably, the beamformer computes the direction(s) of arrival independently in each of a plurality of possibly overlapping time slices. All the time slices have the same duration. The duration of the time slices is related to the bandwidth of the pulse.

The present invention includes at least three innovative advances over the prior art.

The first innovation is the calculation of directions of arrival of signals received by an array of two or more receivers from the upper surface of the content and the derivation, from those directions of arrival, of measured distances from the array to the upper surface of the content. It is known in the prior art to use more than one acoustic receiver. It even is known in the prior art to sum all the received signals in order to boost the signal-to-noise ratio and to narrow the beamwidth. It is not known to process the received signals coherently to measure distances that correspond to specific directions.

The second innovation is the mapping of the upper surface of the bin content. The prior art of acoustic measurement measures a single distance from the receiver(s) to the upper surface of the bin content.

The third innovation is the shaping of the acoustic pulse by optimizing the length and/or frequency content of the acoustic pulse. The only pulse shape parameter that is optimized in the prior art is the pulse power, that is optimized relative to the measured distance.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a system for measuring the quantity of material stored in a bin such as a silo. Specifically, the present invention can be used to monitor inventory in a silo.

The principles and operation of content measuring according to the present invention may be better understood with reference to the drawings and the accompanying description.

Figure 1:
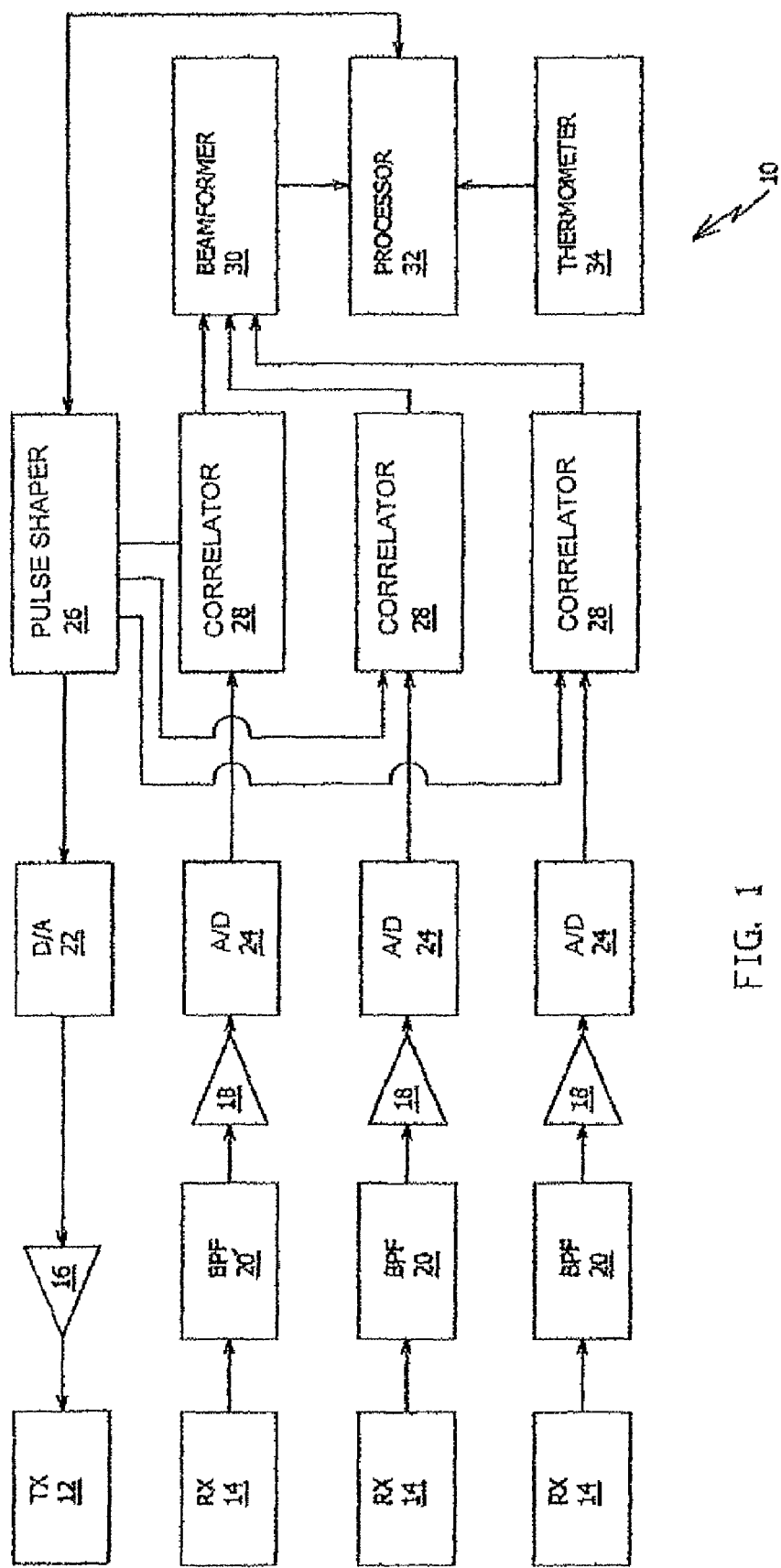
FIG. 1 is a high-level schematic functional block diagram of a system of the present invention.

Referring now to the drawings, FIG. 1 is a high-level schematic functional block diagram of a system 10 of the present invention. The arrows in FIG. 1 indicate the direction of signal flow. System 10 includes an acoustic transmitter (speaker) 12 and three acoustic receivers (microphones) 14. A pulse shaper 26 synthesizes digital pulse forms as described below. The digital pulse forms are converted to analog electrical pulses by a D/A converter 22 and amplified by an amplifier 16. The amplified analog electrical pulses are converted to audio pulses by transmitter 12. Echoes of these audio pulses are received and converted to analog electrical signals by receivers 14, filtered by bandpass filters 20 that preferably are matched to the shape of the audio pulses, amplified by amplifiers 18 and sampled by A/D converters 24 to provide corresponding digital signals. The digital signals are correlated with the corresponding digital pulse forms by correlators 28. The directions of arrival of the correlated signals are computed by a beamformer 30. A processor 32 converts the correlated signals into corresponding round-trip acoustic travel times and then converts those travel times, with the help of a temperature measurement obtained by a digital thermometer 34, into estimated travel distances along the directions of arrival.

Figure 2:
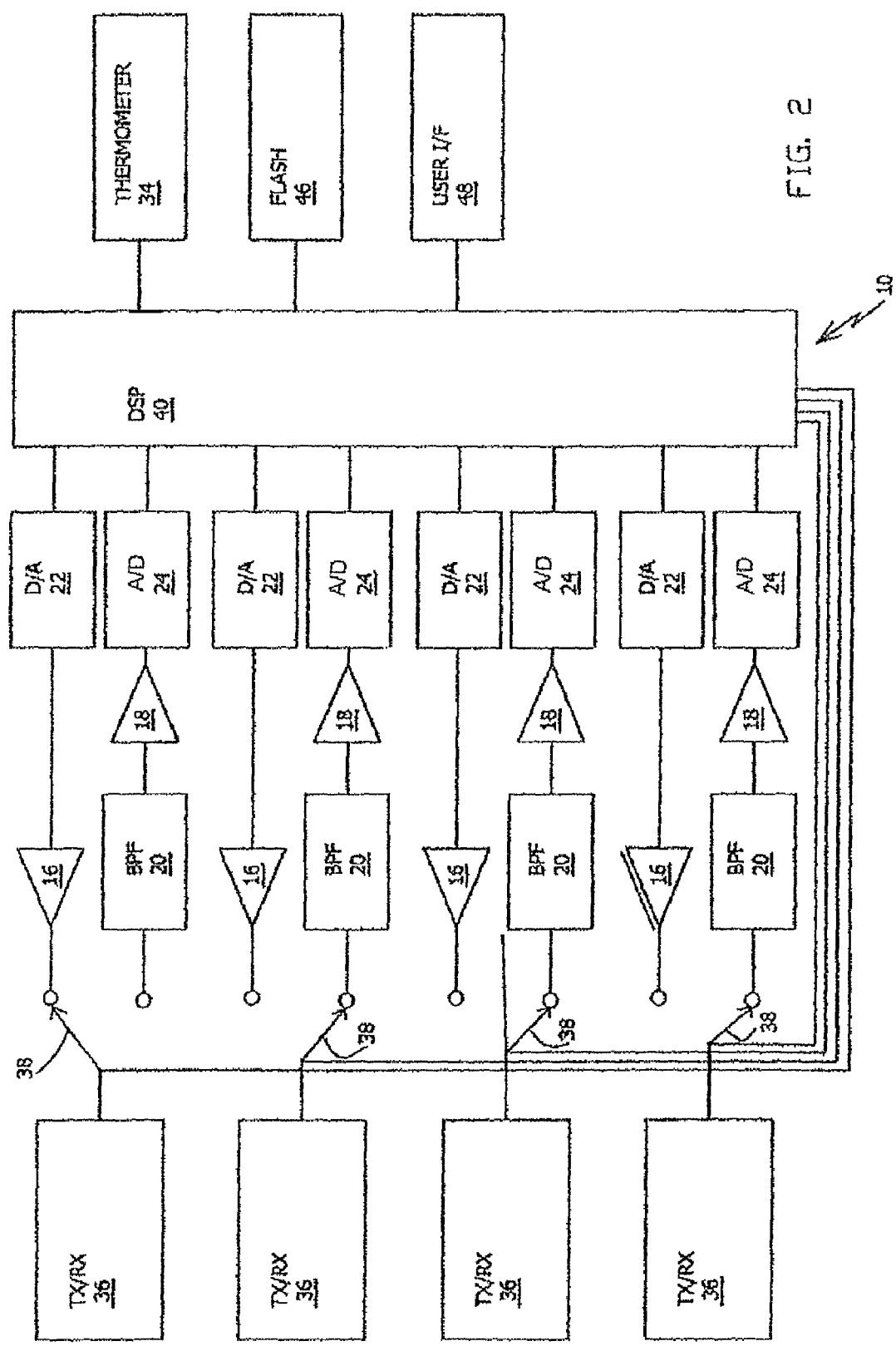
FIG. 2 is a schematic block diagram of a preferred physical embodiment of the system of FIG. 1.

FIG. 2 is a schematic block diagram of a preferred physical embodiment of system 10. In the embodiment illustrated in FIG. 2, the functions of transmitter 12 and receivers 14 are shared by transceivers 36. Each transceiver 36 operates as either transmitter 12 or one of receivers 14 depending on the setting of a respective switch 38. The digital functionality of system 10 (pulse shaper 26, correlators 28, beamformer 30, processor 32) is implemented by a digital signal processor (DSP) 40 executing code that is stored in a flash memory 46. The results of the processing are displayed at a display in a user interface 48.

DSP 40 cycles the function of transmitter 12 among transceivers 36 by setting switches 38 so that one or more of transceivers 36 functions as transmitter 12 and the other transceivers 36 function as receivers 14. This cycling is done separately for two different purposes. One of the purposes is to measure a set of distances from transceivers 36 towards the top of the content of a silo along beam is synthesized by beamformer 30, as described below. The other purpose is to calibrate transceivers 36 that function as receivers 14 relative to a calibration pulse emitted by transceiver 36 that functions as transmitter 12.

There are two preferred modes of using transceivers 36 as both transmitters and receivers to measure the distances to the top of the contents. In the first mode, all transceivers 36 transmit the same pulse coherently and simultaneously. In the second mode, transceivers 36 alternate in transmitting the pulse. Under both modes, after a pulse is transmitted, all switches 38 are set to their lower positions so that all transceivers 36 function as receivers. Under the second mode, this allows an array of n transceivers to function as a virtual array of $(n^2+n)/2$ virtual receivers. (Using M transmitters and N receivers gives MN independent signals. Using n transceivers alternately as transmitters and receivers reduces the number of independent signals to $(n^2+n)/2$ because of the symmetry of transmitting and receiving with each pair of transceivers.)

The second mode also doubles the effective geometrical array size. The directionality of a receiver array is based on the relative delays of the signals arriving at the receivers. When transmitting from a single transmitter to an array of receivers, the relevant delays are the differences in travel time from the target to the receivers. When alternately transmitting and receiving by an array of transceivers, the relevant delays are the differences in the round-trip travel time, which is twice the travel time from the target to the receiver. Achieving an equivalent directionality using a single transmitter would require doubling the receiver array size.

In other embodiments of system 10, application-specific functionality such as the functionality of pulse shaper 26, correlators 28 and beamformer 30 is implemented in application-specific integrated circuits rather than by a digital signal processor. In yet other embodiments of system 10, a general-purpose computer system is used in place of DSP 40, flash memory 46 and user interface 48.

Figure 3:
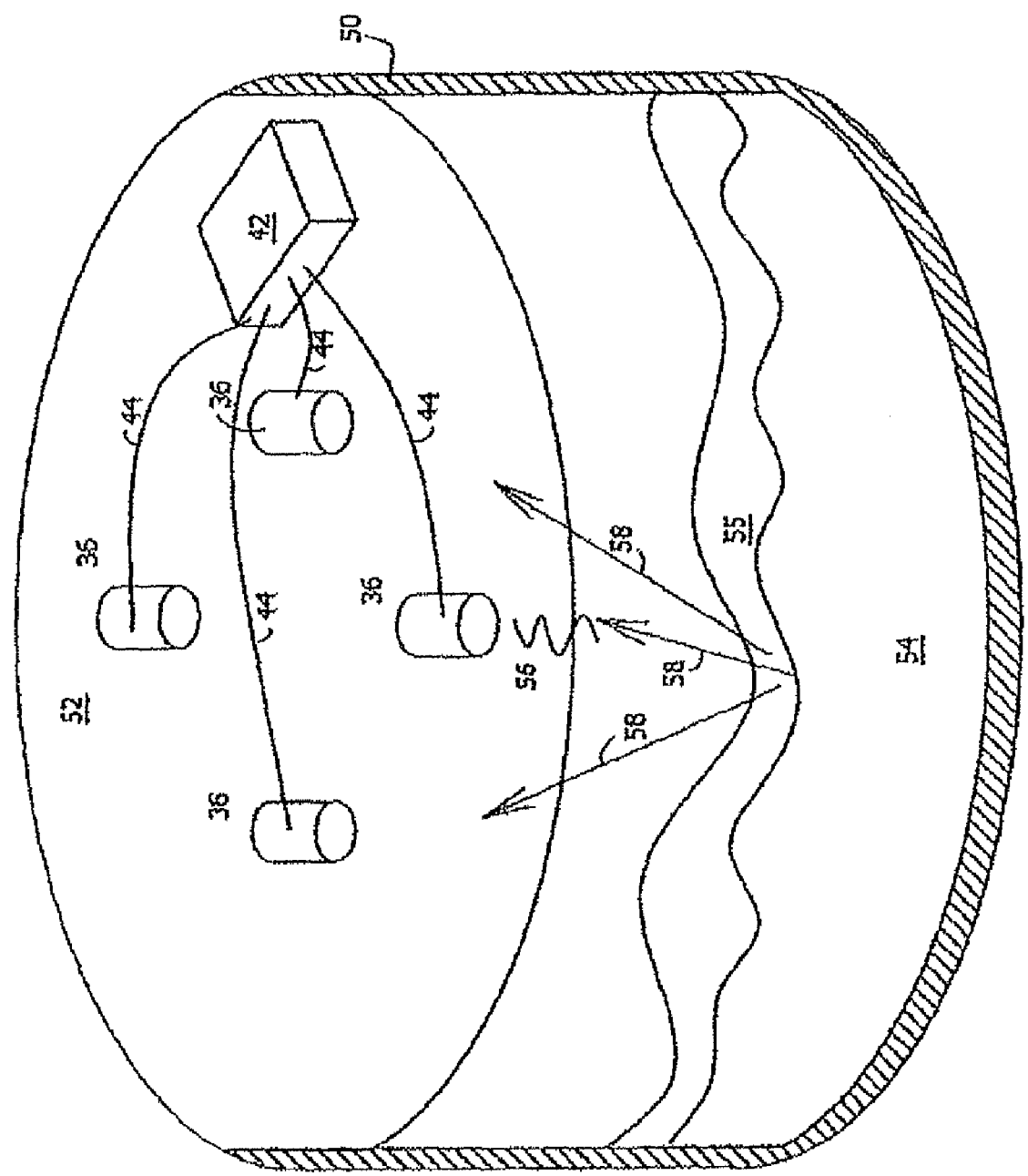
FIG. 3 is a partially cut-away view of a silo with the system of FIG. 1 mounted on the ceiling of the silo.

FIG. 3 is a partially cut-away view of a silo 50 with system 10 mounted on the ceiling 52 of silo 50. Four transceivers 36 are mounted in a square configuration, so that no matter which transceiver 36 serves as transmitter 12 the other three transceivers 36 that serve as receivers 14 are in a non-collinear configuration. The remaining components of system 10 are enclosed in a housing 42 that also is mounted on ceiling 52. Transceivers 36 are operationally connected to the rest of system 10 by wires 44. Transceiver(s) 36 that function(s) as transmitter 12 emit(s) an acoustic pulse 56 towards the upper surface 55 of content 54 of silo 50. Acoustic pulse 56 is represented symbolically in FIG. 3 as a waveform emerging from one of transceivers 36. An echo of acoustic pulse 56 that is reflected from upper surface 55 back towards transceivers 36 is represented in FIG. 3 by arrows 58.

In the specific configuration illustrated in FIG. 3, only a portion of user interface 48 is inside housing 42 and includes a wireless transceiver for communicating with the remainder of user interface 48 at a more convenient location. In an alternative configuration, housing 42 is mounted in a location that is more accessible to the user than ceiling 52.

Echo 58, that is received by transceivers 36 functioning as receivers 14, is transformed to corresponding respective analog electrical signals by transceivers 36. The analog electrical signals are filtered by bandpass filters 20, amplified by amplifiers 18 and converted to corresponding digital signals by A/D converters 24. Correlators 28 correlate these digital signals with the waveform of pulse 56. Beamformer 30 uses known algorithms to compute the directions of arrival of the correlated digital signals and to distinguish signals that arrive directly from upper surface 55 from signals that arrive along other paths (the latter signals constituting deterministic noise in the present context). That transceivers 36 are not collinear allows beamformer 30 to scan upper surface 55 in two dimensions to obtain a three-dimensional map of upper surface 55. The difference in time between the start of the transmission of pulse 56 and the leading edge of a waveform that arrives directly from upper surface 55 is the two-way travel time between the array of transceivers 36 and the patch on upper surface 55 that is sampled by that waveform. Processor 32 multiplies half of this travel time by the speed of sound in the air above upper surface 55 to obtain the distance from the array of transceivers 36 to the sampled patch on upper surface 55. Processor 32 obtains the speed of sound c in meters per second using the relationship $$c = 331.5\sqrt{1 + \frac{T}{273}}$$

where T is the temperature inside silo 50 in degrees Celsius as measured by thermometer 34.

The simplest way for beamformer 30 to compute directions of arrival of incoming signals is to synthesize beams by summing the correlated signals while varying the relative phases (or, equivalently, the relative delays) of the correlated signals, as is known in the art. It is for this reason that beamformer 30 is referred to herein as a "beamformer". Much better results are obtained by using more sophisticated adaptive Direction-Of-Arrival (DOA) algorithms, such as MUltiple Signal Classification (MUSIC), Stochastic Maximum Likelihood (SML), Deterministic Maximum Likelihood (DML) or Estimation of Signal Parameters via Rotational Invariance Techniques (ESPRIT). To overcome the limited ability of these algorithms to estimate several sources simultaneously, and in particular to help these algorithms in distinguishing coherent echoes of pulse 56 that arrive at the array of transceivers 36 from different directions, the received signals are processed separately in overlapping time slices whose length is selected in accordance with the bandwidth of pulse 56. The bandwidth of pulse 56 in turn is selected to achieve the desired resolution of the distance from the array of transceivers 36 to upper surface 55. For example, if pulse 56 has a passband of 3.5 KHz to 4.5 KHz, the distance resolution is approximately 340 m/sec÷1000 sec$^{-1}$÷2=17 cm. The corresponding time slices are about 1 millisecond long (the reciprocal of the pulse bandwidth). The accuracy of the distance measurement also depends on the digitization rate of A/D converters 24 and on the signal-to-noise ratio, and therefore can be much better than the resolution. The preferred sampling rate of 44 KHz gives a potential accuracy, at high S/N, of 340 msec÷44,000 sec$^{-1}$2=3.8 mm.

The distances from the array of transceivers 36 to several patches on upper surface 55 constitutes a map of upper surface 55. Given the interior geometry of silo 50, it is straightforward to estimate from this map the volume of content 54. Multiplying the volume of content 54 by the density of content 54 gives the mass of content 54.

Figure 4:
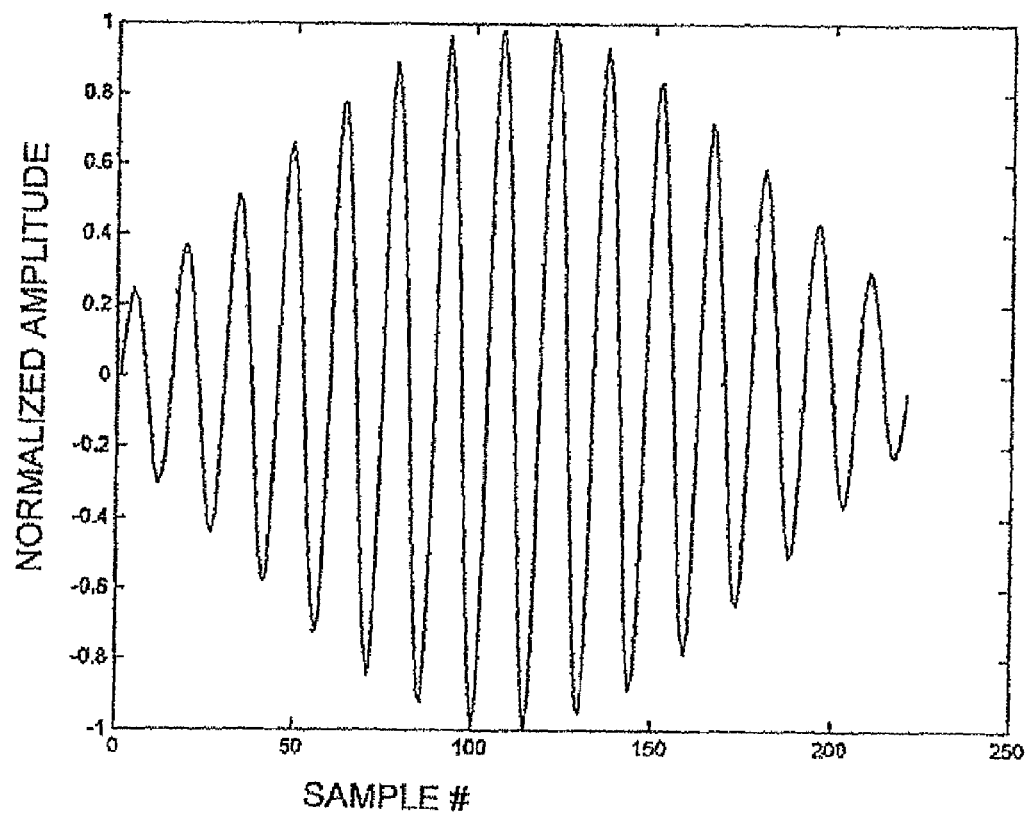
FIG. 4 shows an exemplary pulse shape.

Any suitable pulse shape may be used for pulse 56. FIG. 4 shows one such pulse 56: a 5 millisecond Kaiser pulse modulated at 3 KHz. (The abscissa in FIG. 4 is sample number and the pulse waveform is sampled at 44.1 samples per millisecond.) Pulses also may be shaped by binary phase coding techniques such as Barker coding, as is known from the field of radar. The preferred frequency band of pulse 56 for mapping upper surface 55 in the presence of dust above upper surface 55 is between 3 KHz and 6 KHz.

Figure 5:
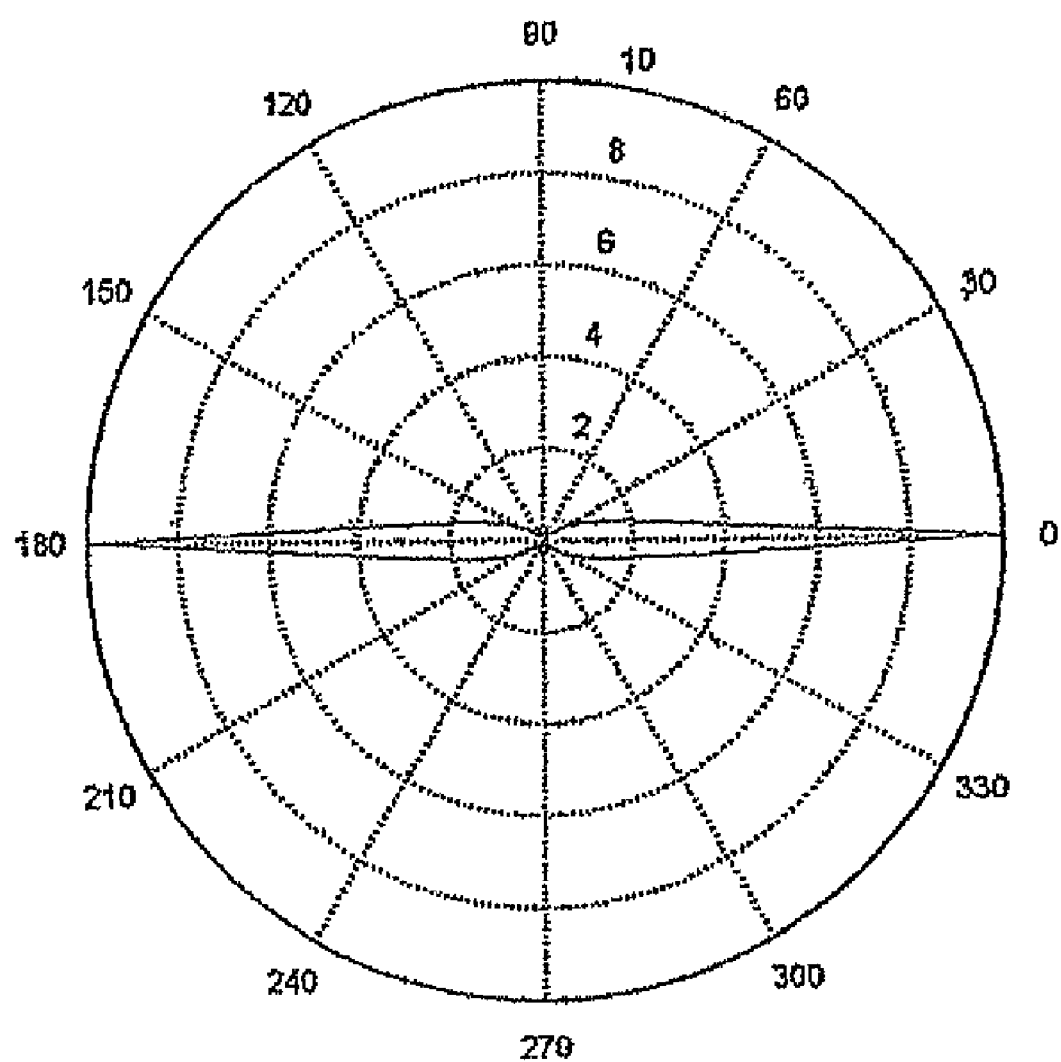
FIG. 5 is a polar plot of the superdirectivity of the present invention.

The angular resolution of the mapping of upper surface 55 is improved by superdirective processing of the correlated signals. See, for example, M. Brandstein and D. Wards (eds.), *Microphone Arrays Signal Processing Techniques and Applications* (Springer, 2001). FIG. 5 is a polar plot of the superdirectivity of two receivers separated by a distance of half a wavelength of the received signal, at a signal-to-noise ratio of 20 dB. It is clear from this plot that the present invention has sufficient angular resolution to map upper surface 55 even in the presence of "coning".

The shape of pulse 56 is set by pulse shaper 26. Preferably, processor 32 optimizes this shape iteratively by manipulating the parameters of the shape of pulse 56. One important parameter is the length (i.e. the duration) of pulse 56. The longer pulse 56, the higher the signal-to-noise ratio; but pulse 56 must not be so long that the trailing edge of pulse 56 overlaps in time with the arrival of echoes 58 at receivers 14, in order for transceivers 36 that transmit pulse 56 to also serve as receivers 14 as described above. Starting with a trial pulse length based on an initial guess of the normal distance from the array of transceivers 36 to upper surface 55, processor 32 varies the pulse length iteratively to optimize the pulse length. With pulse length optimized, the frequency content of pulse 56 is optimized relative to the observed attenuation and observed ambient noise.

Although transceivers 36 are shown in FIG. 3 deployed on ceiling 52 of silo 50, transceivers 36 may be deployed in any convenient location above upper surface 55, for example on the wall of silo 50.

In principle, using only one of transceivers 36 as transmitter 12 suffices to map upper surface 55 because beamformer 30 can scan upper surface 55 by appropriate manipulation of signals from any non-collinear array of receivers 14. It is preferable, however, to obtain measurements using all transceivers 36 alternately as transmitter 12, for the sake of redundancy.

While the invention has been described with respect to a limited number of embodiments, it will be appreciated that many variations, modifications and other applications of the invention may be made.

What is claimed is:

1. A system for measuring a height of a content of a bin, comprising:
   (a) an array of at least three non-collinear transceivers for transmitting, substantially simultaneously, respective pulses of acoustic energy towards an upper surface of the content and receiving an echo of each said pulse, each said transceiver producing a respective signal in response to each said echo; and
   (b) a processing apparatus, for jointly transforming said signals into at least one measured distance from said array to said upper surface, that includes:
       for each said transceiver, a correlator for correlating a waveform of each said pulse with said respective signal, thereby producing a correlated signal, and
       (ii) a beamformer for computing at least one direction of arrival of said correlated signals from said upper surface to said array.

2. The system of claim 1, wherein said processing apparatus is operative to compute, for each said direction of arrival, a corresponding said measured distance.

3. The system of claim 1, further comprising:
   (c) a thermometer for measuring an interior temperature of the bin, said processing apparatus basing said transforming, of said signals into said at least one measured distance, on said measured interior temperature.

4. The system of claim 1, wherein said processing apparatus is operative to calibrate said transceivers by transmitting calibration pulses among said transceivers.

5. The system of claim 4, wherein said processing apparatus is operative to transform said measured distances into an estimate of a quantity of the content.

6. The system of claim 1, wherein said processing apparatus transforms said signals into a plurality of said measured distances.

7. The system of claim 1, wherein said beamformer computes said at least one direction of arrival independently in each of a plurality of time slices having a common duration that is related to a bandwidth of said pulses.

8. A method of measuring a height of content in a bin, comprising the steps of:
   (a) using an array of at least three non-collinear transceivers:
       (i) substantially simultaneously transmitting a plurality of pulses of acoustic energy towards an upper surface of the content, and
       (ii) receiving an echo of each said pulse, each said transceiver producing a respective signal in response to said echo; and
   (b) transforming said signals into at least one measured distance from said array to said upper surface by steps including:

(i) for each said transceiver, correlating a waveform of each said pulse with said respective signal to produce a correlated signal, (ii) computing at least one direction of arrival of said correlated signals from said upper surface to said array, and (iii) for each said direction of arrival, computing a corresponding said measured distance.

9. The method of claim 8, further comprising the step of:

(c) measuring an interior temperature of the bin, said transforming of said signals to said at least one measured distance being based on said measured interior temperature.

10. The method of claim 8, wherein said signals are transformed into a plurality of said measured distances, the method further comprising the step of:

(c) transforming said measured distances into an estimate of a quantity of the content.

11. The method of claim 8, wherein said at least one direction of arrival is computed independently in each of a plurality of time slices having a common duration that is related to a bandwidth of said pulses.

12. A system for measuring a height of a content of a bin, comprising:

(a) an array of at least three non-collinear transceivers for transmitting sequential respective pulses of acoustic energy towards an upper surface of the content and receiving an echo of each said pulse, each said transceiver producing a respective signal in response to each said echo; and (c) a processing apparatus, for jointly transforming said signals into at least one measured distance from said array to said upper surface, that includes:

(i) for each said transceiver, a correlator for correlating a waveform of each said pulse with said respective signal, thereby producing a correlated signal, and (ii) a beamformer for computing at least one direction of arrival of said correlated signals from said upper surface to said array;

wherein, subsequent to said transmission of one of said pulses, said transmission of a next said pulse is delayed until said echo of said one pulse has been received.

13. A method of measuring a height of content in a bin, comprising the steps of:

(a) using an array of at least three non-collinear transceivers:

(i) sequentially transmitting a plurality of pulses of acoustic energy towards an upper surface of the content, and (ii) receiving an echo of each said pulse, each said transceiver producing a respective signal in response to said echo; and (b) transforming said signals into at least one measured distance from said array to said upper surface by steps including:

(i) for each said transceiver, correlating a waveform of each said pulse with said respective signal to produce a correlated signal, (ii) computing at least one direction of arrival of said correlated signals from said upper surface to said array, and (iii) for each said direction of arrival, computing a corresponding said measured distance;

wherein, subsequent to said transmission of one of said pulse, said transmission of a next said pulse is delayed until said echo of said one pulse has been received.

14. A system for measuring a height of a content of a bin, comprising:

(a) at least one transmitter for transmitting a pulse of acoustic energy towards an upper surface of the content;

(b) an array of at least three non-collinear receivers for receiving an echo of said pulse, each said receiver producing a respective signal in response to said echo;

(c) a processing apparatus, for jointly transforming said signals into at least one measured distance from said array to said upper surface, that includes:

(i) for each said receiver, a correlator for correlating a waveform of said pulse with said respective signal, thereby producing a correlated signal, and (ii) a beamformer for computing at least one direction of arrival of said correlated signals from said upper surface to said array; and (d) a pulse shaper and repeater operative to repeatedly transmit said pulse, using said at least one transmitter, while adjusting a shape of said pulse, responsive to said signals, until said signals are suitable for said transforming by said processing apparatus of said signals into said at least one measured distance.

15. The system of claim 14, wherein said pulse shaper and repeater adjusts said shape of said pulse by adjusting a parameter of said shape selected from the group consisting of a length of said pulse and a frequency of said pulse.

16. A method of measuring a height of content in a bin, comprising the steps of (a) transmitting a pulse of acoustic energy towards an upper surface of the content;

(b) receiving an echo of the pulse, using an array of at least three non-collinear receivers, each said receiver producing a respective signal in response to said echo;

(c) transforming said signals into at least one measured distance from said array to said upper surface by steps including:

(i) for each said receiver, correlating a waveform of said pulse with said respective signal to produce a correlated signal, (ii) computing at least one direction of arrival of said correlated signals from said upper surface to said array, and (iii) for each said direction of arrival, computing a corresponding said measured distance; and (d) repeating said transmitting of said pulse while adjusting respective shape of said pulse, responsive to said signals, until said signals are suitable for said transforming of said signals into said at least one measured distance.

17. A system for measuring a height of a content of a bin, comprising:

(a) at least one transmitter for transmitting a pulse of acoustic energy towards an upper surface of the content;

(b) an array of at least three non-collinear receivers for receiving an echo of said pulse, each said receiver producing a respective signal in response to said echo; and (c) a processing apparatus, for jointly transforming said signals into a plurality of measured distances from said array to a plurality of locations on said upper surface, that includes:

(i) for each said receiver, a correlator for correlating a waveform of said pulse with said respective signal, thereby producing a correlated signal, and (ii) a beamformer for computing a plurality of directions of arrival of said correlated signals from said upper surface to said array.

18. A method of measuring a height of content in a bin, comprising the steps of:
- (a) transmitting a pulse of acoustic energy towards an upper surface of the content;
- (b) receiving an echo of the pulse, using an array of at least three non-collinear receivers, each said receiver producing a respective signal in response to said echo; and
- (c) transforming said signals into a plurality of measured distances from said array to a plurality of locations on said upper surface by steps including:
  - (i) for each said receiver, correlating a waveform of said pulse with said respective signal to produce a correlated signal,
  - (ii) computing a plurality of directions of arrival of said correlated signals from said upper surface to said array, and
  - (iii) for each said direction of arrival, computing a corresponding said measured distance.

* * * * *

UNITED STATES PATENT AND TRADEMARK OFFICE
CERTIFICATE OF CORRECTION

Page 1 of 1

PATENT NO.         : 8,091,421 B2
APPLICATION NO.    : 10/571693
DATED              : January 10, 2012
INVENTOR(S)        : Ofir Perl et al.

It is certified that error appears in the above-identified patent and that said Letters Patent is hereby corrected as shown below:

IN THE CLAIMS:

Column 8,

Claim 1, line 28, should be corrected as follows:
Change
  --for each said....--
  to
  "(i) for each said...."

Signed and Sealed this
Sixth Day of March, 2012

David J. Kappos
*Director of the United States Patent and Trademark Office*